(12) United States Patent
Hagelin et al.

(10) Patent No.: US 6,556,740 B1
(45) Date of Patent: Apr. 29, 2003

(54) FIBER OPTIC CROSS CONNECT WITH FOLDING OF LIGHT BEAMS

(75) Inventors: Paul Merritt Hagelin, Saratoga, CA (US); Amal Ranjan Bhattarai, Davis, CA (US)

(73) Assignee: NanoGear, Santa Clara, CA (US)

( * ) Notice: Subject to any disclaimer, the term of this patent is extended or adjusted under 35 U.S.C. 154(b) by 0 days.

(21) Appl. No.: 09/549,800

(22) Filed: Apr. 14, 2000

(51) Int. Cl.[7] ................................................. G02B 6/26
(52) U.S. Cl. .......................................................... 385/18
(58) Field of Search ............................... 385/16, 17, 18, 385/25

(56) References Cited

U.S. PATENT DOCUMENTS

| | | | |
|---|---|---|---|
| 5,155,778 A | 10/1992 | Magel et al. | 385/18 |
| 5,440,654 A | 8/1995 | Lambert, Jr. | 385/17 |
| 5,524,153 A | 6/1996 | Laor | 385/16 |
| 5,774,604 A * | 6/1998 | McDonald | |
| 5,808,780 A | 9/1998 | McDonald | 359/290 |
| 5,960,132 A | 9/1999 | Lin | 385/18 |
| 5,982,554 A * | 11/1999 | Goldstein | |
| 6,385,364 B1 * | 5/2002 | Abushagur | 385/18 |

FOREIGN PATENT DOCUMENTS

| | | |
|---|---|---|
| EP | 1099966 | 5/2001 |
| EP | 1102096 | 5/2001 |

OTHER PUBLICATIONS

Lin, L.Y. et al., "Free–Space Micromachined Optical Switches with Submillisecond Switching Time for Large–Scale Optical Crossconnects," IEEE Apr. 1998, vol. 10, No. 4, pp. 525–527.

Lunardi, L.M. et al., "Micromachined Optical Crossconnects with Integrated Signal–Monitoring Functionality," OFC/IOOC, Feb. 21, 1999, pp. 128–130.

"Optical–layer Networking: Opportunities for and Progress in Lightwave Micromachines," OFC 2000 Tutorials, Lih Y. Lin and Evan Goldstein, ATT Research.

* cited by examiner

*Primary Examiner*—Neil Abrams
(74) *Attorney, Agent, or Firm*—Sawyer Law Group LLP

(57) ABSTRACT

The present invention provides an improved fiber optic cross connect (OXC) package which reduces the size of the device. The OXC includes a chip, the chip including a plurality of input micromirrors and a plurality of output micromirrors; and a reflector optically coupled to the plurality of input micromirrors and the plurality of output micromirrors. The OXC package in accordance with the present invention folds the light beam during scanning. In the preferred embodiment, the OXC package comprises input and output micromirrors on a single chip. A reflector is placed above both the input and output micromirrors for folding the light beam as it travels between an input micromirror and an output micromirror. In the preferred embodiment, the distance from the input/output micromirror to the reflector is approximately one-half of the Rayleigh Length of the light beam. With the folding of the light beam in this manner, the input and output micromirrors may be placed in close proximity to each other, resulting in a smaller device.

7 Claims, 3 Drawing Sheets

FIBER OPTIC CROSS CONNECT WITH FOLDING OF LIGHT BEAMS

FIELD OF THE INVENTION

The present invention relates to fiber optic cross connects, and more particularly to the packaging for fiber optic cross connects.

BACKGROUND OF THE INVENTION

The use of optical cross connect (OXC) switching systems are well known-in the art for directing a light beam from one optical port in an optical transmission system to another optical port. In a typical OXC, a plurality of input optical fibers, or ports, carry light beams into the OXC. The OXC then directs, or switches, the light beams to their respective plurality of output ports. Many conventional OXCs perform the switching utilizing micromirrors, which are micro-machined onto a chip. The micromirrors are used to reflect a light beam from an input port to a particular output port. In this specification, the words "input" and "output" are used to indicate a direction of travel for a light beam into and out of, respectively, a switch. In reality, the input and output ports can be used simultaneously for input and output, as is the case in bi-directional data transfer.

High port count switches utilizing micromirrors are of high demand in the industry. Such switches require a tight packing density of the micromirrors onto the substrate. Some conventional switches use a digital switching matrix for N input and N output ports with an N×N array of micromirrors. This requires a total of $N^2$ number of micromirrors. However, this architecture becomes impractical for switch port counts greater than a few hundred.

Some conventional switches use an analog switching matrix for N input and N output ports. This requires 2*N micromirrors. In this configuration, two separate chips, or one very large chip, are necessary to accommodate port counts greater than a few hundred. However, the use of more than one chip is cumbersome as they need to be aligned to each other within the package of the switch. This adds complexity to the assembly of the package and increases package size. Also, with a hundred or more micromirrors on a single chip, or one half of a two-chip OXC, device yield is compromised due to the large number of possible failure points. Additionally, the optical components of the OXC are typically hermetically sealed. Such hermetic sealing of the optical components requires additional complex steps in the manufacturing process, such as metallization of the fibers or optical component attached to the fibers.

Accordingly, there exists a need for an improved OXC package which reduces the size of the device. The present invention addresses such a need.

SUMMARY OF THE INVENTION

The present invention provides an improved fiber optic cross connect (OXC) package which reduces the size of the device. The OXC includes a chip, the chip including a plurality of input micromirrors and a plurality of output micromirrors; and a reflector optically coupled to the plurality of input micromirrors and the plurality of output micromirrors. The OXC package in accordance with the present invention folds the light beam during scanning. In the preferred embodiment, the OXC package comprises input and output micromirrors on a single chip. A reflector is placed above both the input and output micromirrors for folding the light beam as it travels between an input micromirror and an output micromirror. In the preferred embodiment, the distance from the input/output micromirror to the reflector is approximately one-half of the Rayleigh Length of the light beam. With the folding of the light beam in this manner, the input and output micromirrors may be placed in close proximity to each other, resulting in a smaller device.

DETAILED DESCRIPTION

The present invention provides an improved optical cross connect (OXC) package which reduces the size of the device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The improved OXC package in accordance with the present invention folds the light beam during scanning to allow a small device. In the preferred embodiment, the OXC package comprises input and output micromirrors on a single chip. A reflector is placed above both the input and output micromirrors for folding the light beam as it travels between an input micromirror and an output micromirror. In the preferred embodiment, the distance from the input/output micromirror to the reflector is approximately one-half of the Rayleigh Length of the light beam. The Rayleigh Length is a maximum distance that a beam of light can be kept collimated. The Rayleigh Length depends on the wavelength and minimum diameter "waist" of the beam. It is important to limit the scanned portion of the beam to the Rayleigh Length because diffraction of the light beam beyond the Rayleigh Length produces increased loss and crosstalk. The Rayleigh Length is well known in the art and will not be described in detail here. With the folding of the light beam in this manner, the input and output micromirrors may be placed in close proximity to each other, resulting in a smaller device.

To more particularly describe the features of the present invention, please refer to FIGS. 1 through 3 in conjunction with the discussion below.

Figure 1:
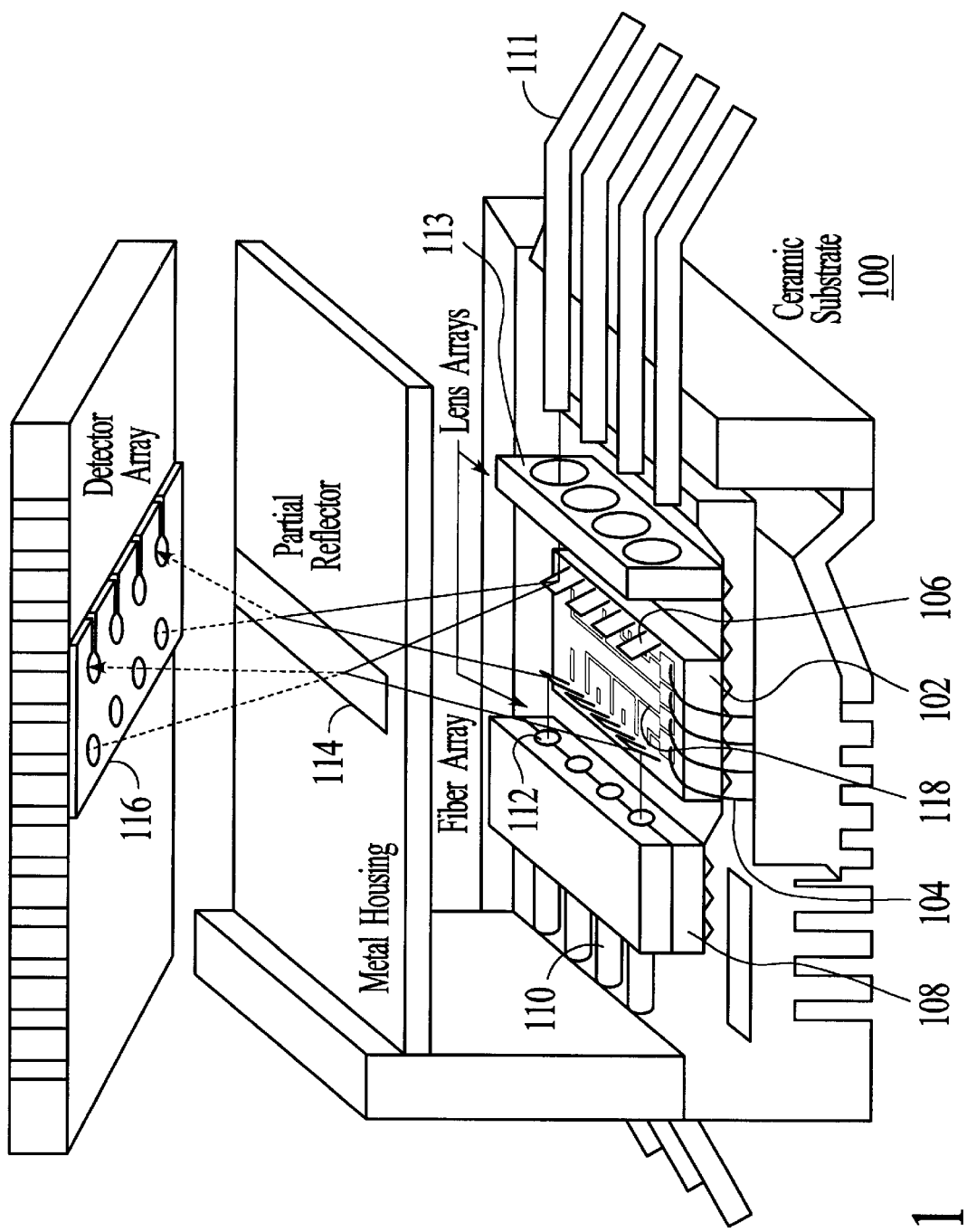
FIG. 1 illustrates a preferred embodiment of a switch architecture which folds light beams in accordance with the present invention.

FIG. 1 illustrates a preferred embodiment of a switch architecture which folds light beams in accordance with the present invention. This architecture comprises a substrate 100 on which resides a chip 102 with a plurality of input micromirrors 104 and a plurality of output micromirrors 106. In the preferred embodiment, the input 104 and output 106 micromirrors are tilted upward at an angle from the chip's surface. Optically coupled to the input micromirrors 104 is an input fiber array 110 and an input lens arrays 112, typically contained within a housing 108. Optically coupled to the output micromirrors 106 is an output fiber array 111 and an output lens array 113. The lens arrays 112, 113 each typically comprise a plurality of collimators. Integrated circuits 118 and wires for controlling the input 104 and output 106 micromirrors may populate the same chip 102. This eliminates the need for a separate chip for the integrated circuits, as is required with conventional switches. Also, with the integrated circuits 118 and wires so close to the input 104 and output 106 micromirrors, the wires are shorter than conventional integrated circuit chips. This reduces the impedance of the wires, and thus lowers the noise in the mirror sensing signals. Placed above the input 104 and output 106 micromirrors is a reflector 114. The reflector 114 may be partially reflecting, allowing some portion of the light beams to traverse the reflector 114 to the detector array 116.

Figure 2:
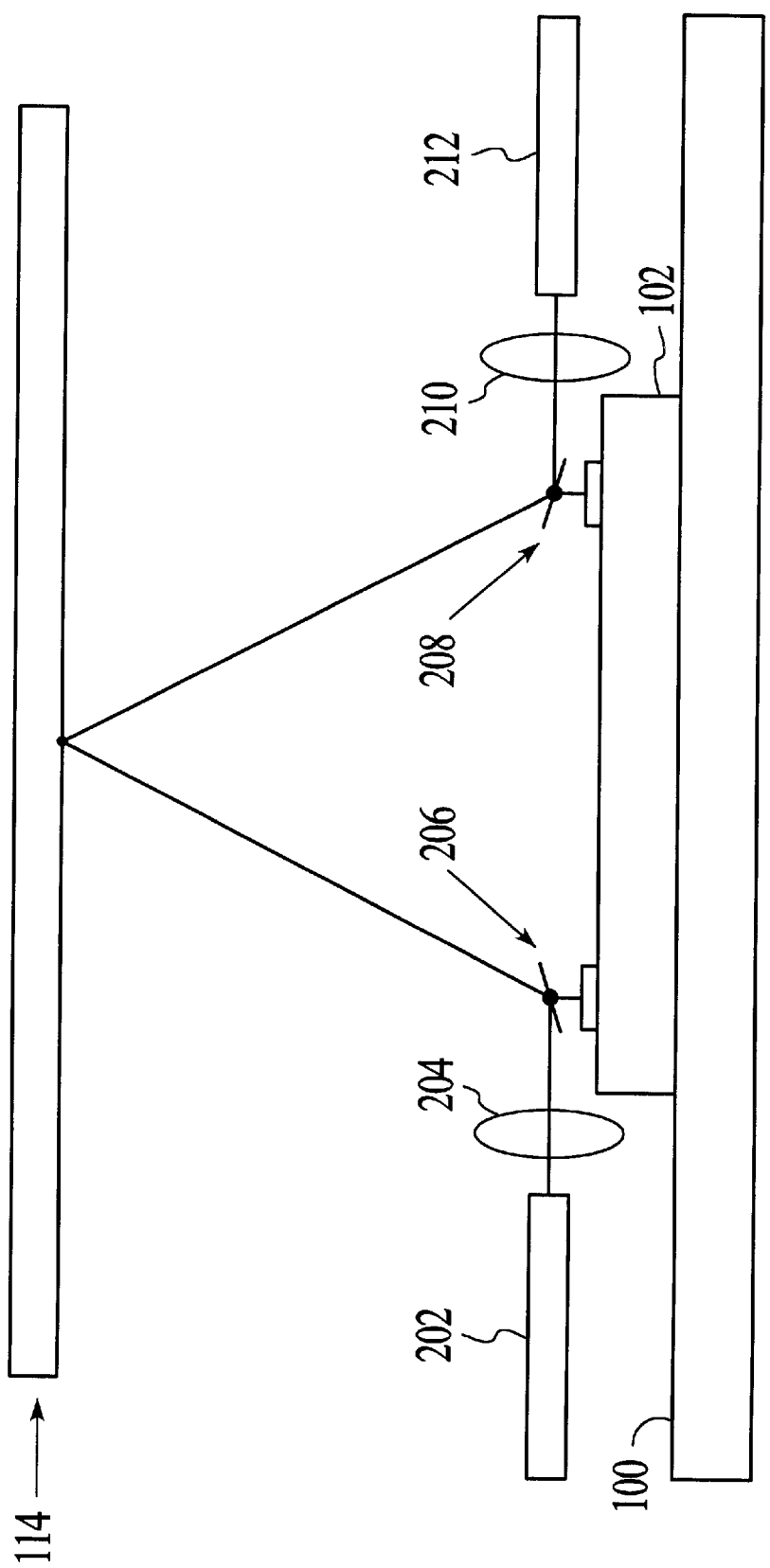
FIG. 2 illustrates a side view of the preferred embodiment of the switch architecture which folds light beams in accordance with the present invention.

FIG. 2 illustrates a side view of the switch architecture which folds light beams in accordance with the present invention. A light beam enters the switch via an input fiber 202 of the input fiber array 110. The light beam is collimated by a collimator 204 of the input lens array 112. The light beam is reflected by an input micomirrors 206 onto the reflector 114. The reflector 114 reflects, or folds, the light beam onto the appropriate output micromirror 208. The output micromirror 208 then reflects the light beam through a collimator 210 of the output lens array 113 to an output fiber 212 of the output fiber array 111. The directing of the light beam to the appropriate output micromirror is controlled by tilting the input micromirror 206 and the output micromirror 208 in appropriate angles. In the preferred embodiment, reflector 114 is placed such that the distance traveled by the light beam from collimator 204 to collimator 210 is approximately equal to the Rayleigh Length of the light beam.

Arrays of photodetectors for sensing light beams may also be used with the architecture which folds light beams in accordance with the present invention. The information received from the photodetectors can be used to confirm the proper selection of input/output channels in the light beams, for monitoring the data flow, and to obtain feedback to correctly position the input 104 and output 106 micromirrors for best alignment to the fibers array 110. Fast photodetectors can monitor traffic real time while slow photodetectors can be used to confirm correct channel switching.

Figure 3:
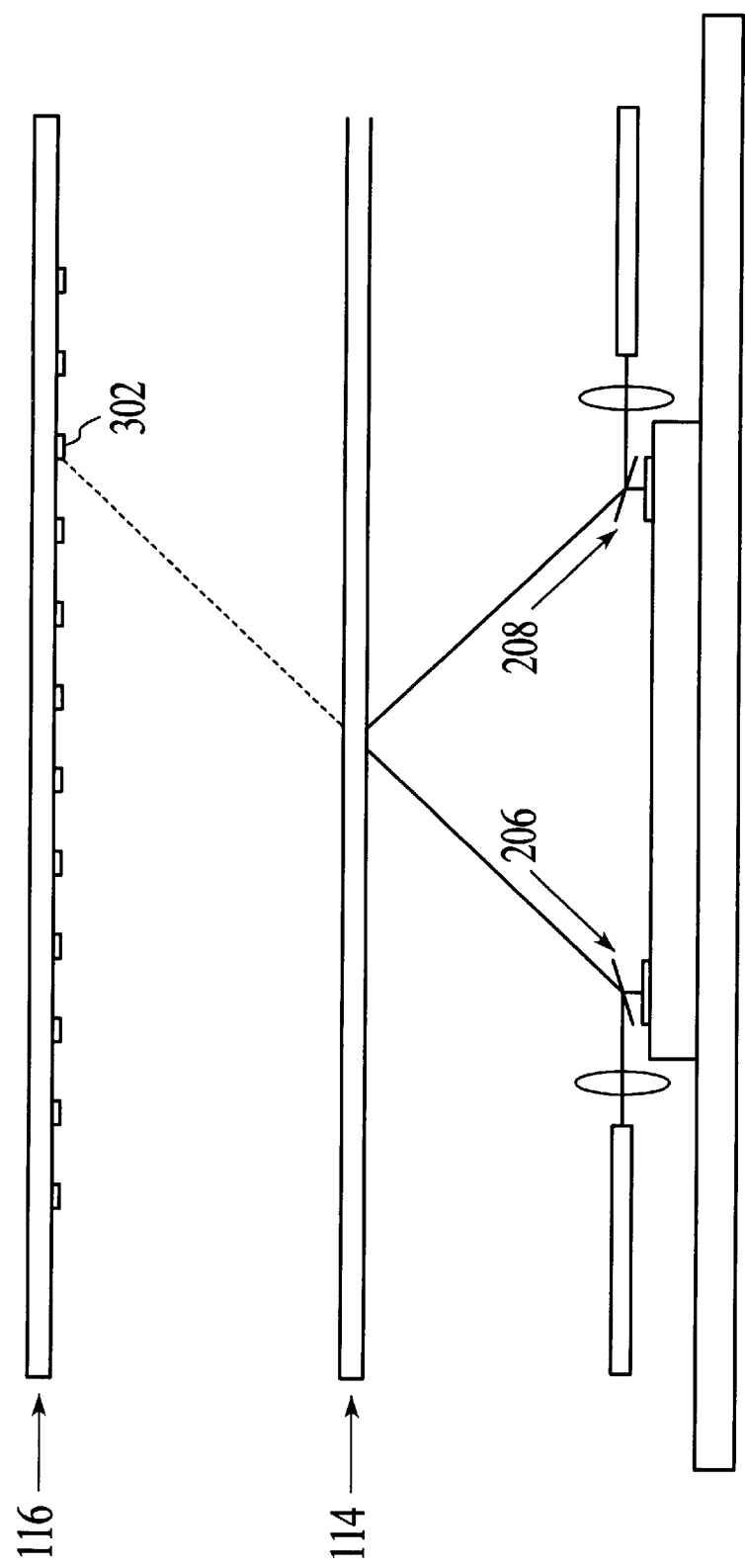
FIG. 3 illustrates an alternative switch architecture which folds light beams in accordance with the present invention.

FIG. 3 illustrates an alternative embodiment of the switch architecture which folds light beams in accordance with the present invention. This architecture is identical to the architecture illustrated in FIG. 2 except for the addition of the detector array 116 above the reflector 114. In this alternative embodiment, the detector array 116 is preferably positioned from the reflector 114 at a distance which is approximately twice the distance from the input 206 and output 208 micromirrors to the reflector 114. In this case, the reflector 114 is partially transmitting to allow some light to proceed to a photodetector 302 of the detector array 116. For example, the reflector 114 may be a glass slab with an anti-reflective coating.

An improved OXC package which reduces the size of the device. The OXC package in accordance with the present invention folds the light beam during scanning. In the preferred embodiment, the OXC package comprises input and output micromirrors on a single chip. A reflector is placed above both the input and output micromirrors for folding light beam as it travels between an input micromirror and an output micromirror. In the preferred embodiment, the distance from the input/output micromirror to the reflector is approximately one-half of the Rayleigh Length of the light beam. With the folding of the light beam in this manner, the input and output micromirrors may be placed in close proximity to each other, resulting in a smaller device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A fiber optic cross connect (OXC) comprising:
    a chip, comprising:
        a plurality of input micromirrors, and
        a plurality of output micromirrors;
    a reflector optically coupled to the plurality of input micromirrors and the plurality of output micromirrors; and
    a detector array optically coupled to the reflector at a side opposite to the plurality of input micromirrors and the plurality of output micromirrors.

2. The OXC of claim 1, wherein the chip further comprises:
    integrated circuits; and
    wires.

3. The OXC of claim 1, wherein the reflector comprises:
    an anti-reflective coating which renders the reflector partially reflective.

4. The OXC of claim 1, wherein a distance between the reflector and the detector array is approximately equal to a distance between the reflector and the plurality of input and output micromirrors.

5. The OXC of claim 1, further comprising:
    an input fiber array;
    an output fiber array;
    an input lens array optically coupled to the input fiber array and the plurality of input micromirrors; and
    an output lens array optically coupled to the output fiber array and the plurality of output micromirrors.

6. The OXC of claim 5, wherein the input and output lens arrays each comprise a plurality of collimators.

7. A fiber optic cross connect (OXC) comprising:
    a chip, comprising:
        a plurality of input micromirrors, and
        a plurality of output micromirrors;
    a reflector optically coupled to the plurality of input micromirrors and the plurality of output micromirrors;
    a detector array optically coupled to the reflector at a side opposite to the plurality of input micromirrors and the plurality of output micromirrors;
    an input fiber array;
    an output fiber array;
    an input lens array optically coupled to the input fiber array and the plurality of input micromirrors; and
    an output lens array optically coupled to the output fiber array and the plurality of output micromirrors.

* * * * *